(12) United States Patent
Yamamura et al.

(10) Patent No.: US 11,385,654 B2
(45) Date of Patent: Jul. 12, 2022

(54) WORKING SYSTEM AND WORKING MACHINE

(71) Applicant: HONDA MOTOR CO., LTD., Tokyo (JP)

(72) Inventors: Makoto Yamamura, Wako (JP); Manabu Dobashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 16/544,072

(22) Filed: Aug. 19, 2019

(65) Prior Publication Data

US 2019/0369639 A1 Dec. 5, 2019

Related U.S. Application Data

(63) Continuation of application No. PCT/JP2017/007930, filed on Feb. 28, 2017.

(51) Int. Cl.
    *G05D 1/02* (2020.01)
(52) U.S. Cl.
    CPC ......... *G05D 1/0259* (2013.01); *G05D 1/0225* (2013.01); *G05D 2201/0208* (2013.01)
(58) Field of Classification Search
    CPC .............. G05D 1/0259; G05D 1/0225; G05D 2201/0208; G05D 1/0265; G05D 1/02
    See application file for complete search history.

(56) References Cited

U.S. PATENT DOCUMENTS

| 7,438,766 | B2 | 10/2008 | Song et al. |
| 8,972,092 | B2 | 3/2015 | Yamamura et al. |
| 9,468,349 | B2 | 10/2016 | Fong et al. |

(Continued)

FOREIGN PATENT DOCUMENTS

| CN | 103246286 A | 8/2013 |
| CN | 103676702 A | 3/2014 |

(Continued)

OTHER PUBLICATIONS

International Search Report for PCT/JP2017/007930 dated Apr. 18, 2017 (partially translated).
Extended European Search Report issued for European Patent Application No. 17898552.9 dated Dec. 19, 2019.

(Continued)

*Primary Examiner* — Brian P Sweeney
(74) *Attorney, Agent, or Firm* — Thomas | Horstemeyer, LLP

(57) ABSTRACT

A working system comprising a self-propelled working machine, an area wire for partitioning a working area of the working machine, and a station provided in the working area and configured to charge the working machine by connecting the working machine to the station, wherein the working machine comprises a traveling unit, a traveling control unit configured to control the traveling unit, a detection unit configured to detect the station, and an information acquisition unit, the information acquisition unit acquires input information which is input by a user, and the input information includes information indicating a layout of the station and the area wire for the station and its peripheral region, and the traveling control unit sets a control parameter of the traveling unit based on the input information in response to detection of the station by the detection unit.

11 Claims, 7 Drawing Sheets

(56) References Cited

U.S. PATENT DOCUMENTS

| | | | |
|---|---|---|---|
| 9,483,053 B2 | 11/2016 | Yamamura et al. | |
| 9,538,702 B2 | 1/2017 | Balutis et al. | |
| 9,538,892 B2 | 1/2017 | Fong et al. | |
| 9,817,398 B2 | 11/2017 | Yamamura et al. | |
| 9,876,370 B2 | 1/2018 | Yamamura et al. | |
| 10,335,004 B2 | 7/2019 | Fong et al. | |
| 2006/0076039 A1 | 4/2006 | Song et al. | |
| 2013/0211647 A1* | 8/2013 | Yamamura | G05D 1/0225 701/22 |
| 2014/0100693 A1 | 4/2014 | Fong et al. | |
| 2016/0174459 A1* | 6/2016 | Balutis | G05D 1/0234 701/25 |
| 2016/0282869 A1 | 9/2016 | Yamamura et al. | |
| 2016/0285288 A1 | 9/2016 | Yamamura et al. | |
| 2016/0299766 A1 | 10/2016 | Shitaya et al. | |
| 2018/0014709 A1* | 1/2018 | O'Brien | A47L 9/2884 |

FOREIGN PATENT DOCUMENTS

| | | |
|---|---|---|
| CN | 105378664 A | 3/2016 |
| CN | 106325271 A | 1/2017 |
| EP | 3073602 A1 | 9/2016 |
| FR | 2876466 A1 | 4/2006 |
| JP | 2003-036116 A | 2/2003 |
| JP | 2014-071847 A | 4/2014 |
| JP | 2015-535373 A | 12/2015 |
| JP | 5828776 B2 | 12/2015 |
| JP | 2016-186751 A | 10/2016 |
| JP | 2016-186752 A | 10/2016 |
| WO | 2018/158844 A1 | 9/2018 |

OTHER PUBLICATIONS

Chinese Office Action issued for Chinese Patent Application No. 201780086698.5 dated Dec. 2, 2021 (with Partial Translation).

* cited by examiner

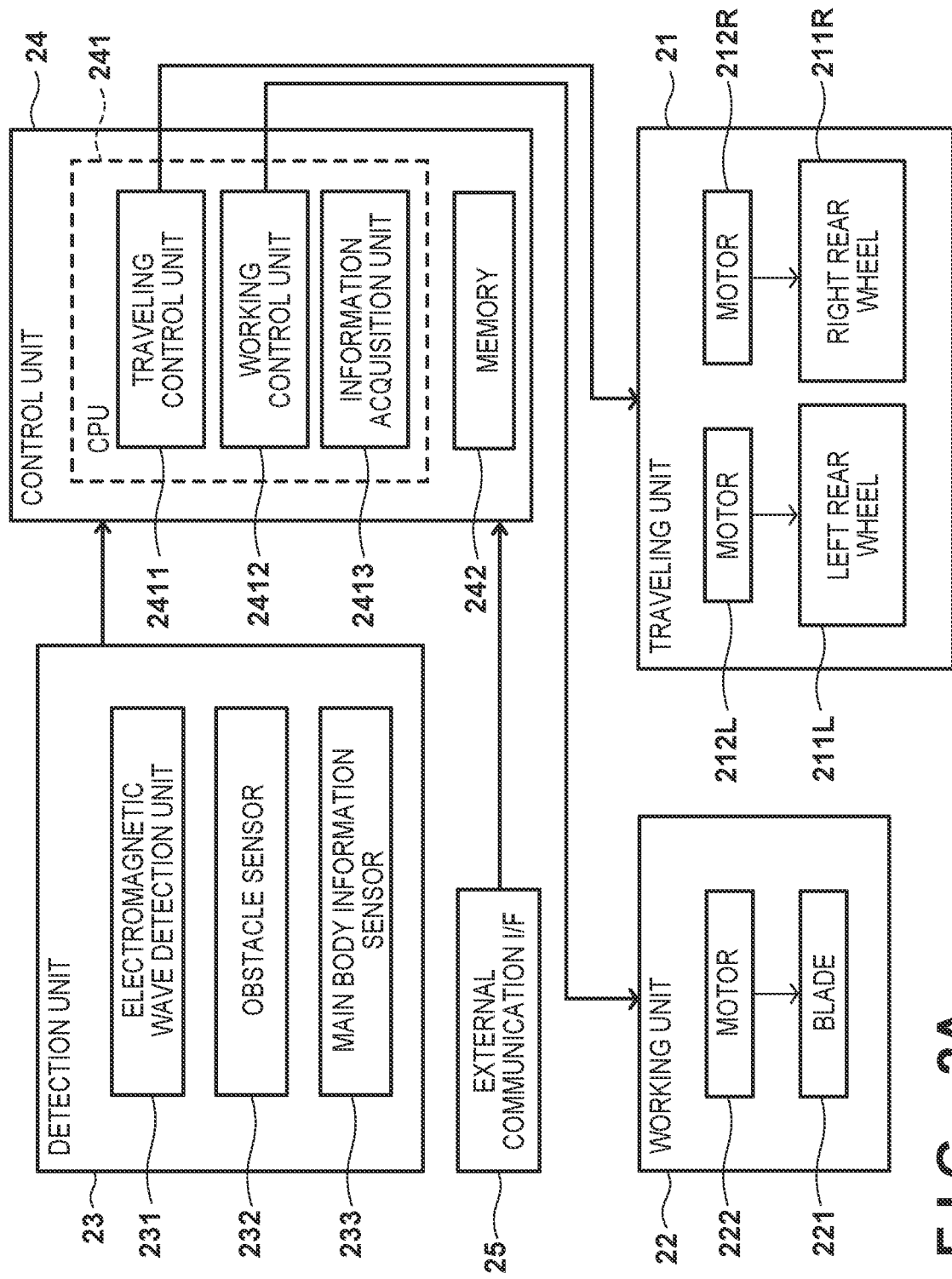
F I G. 2A

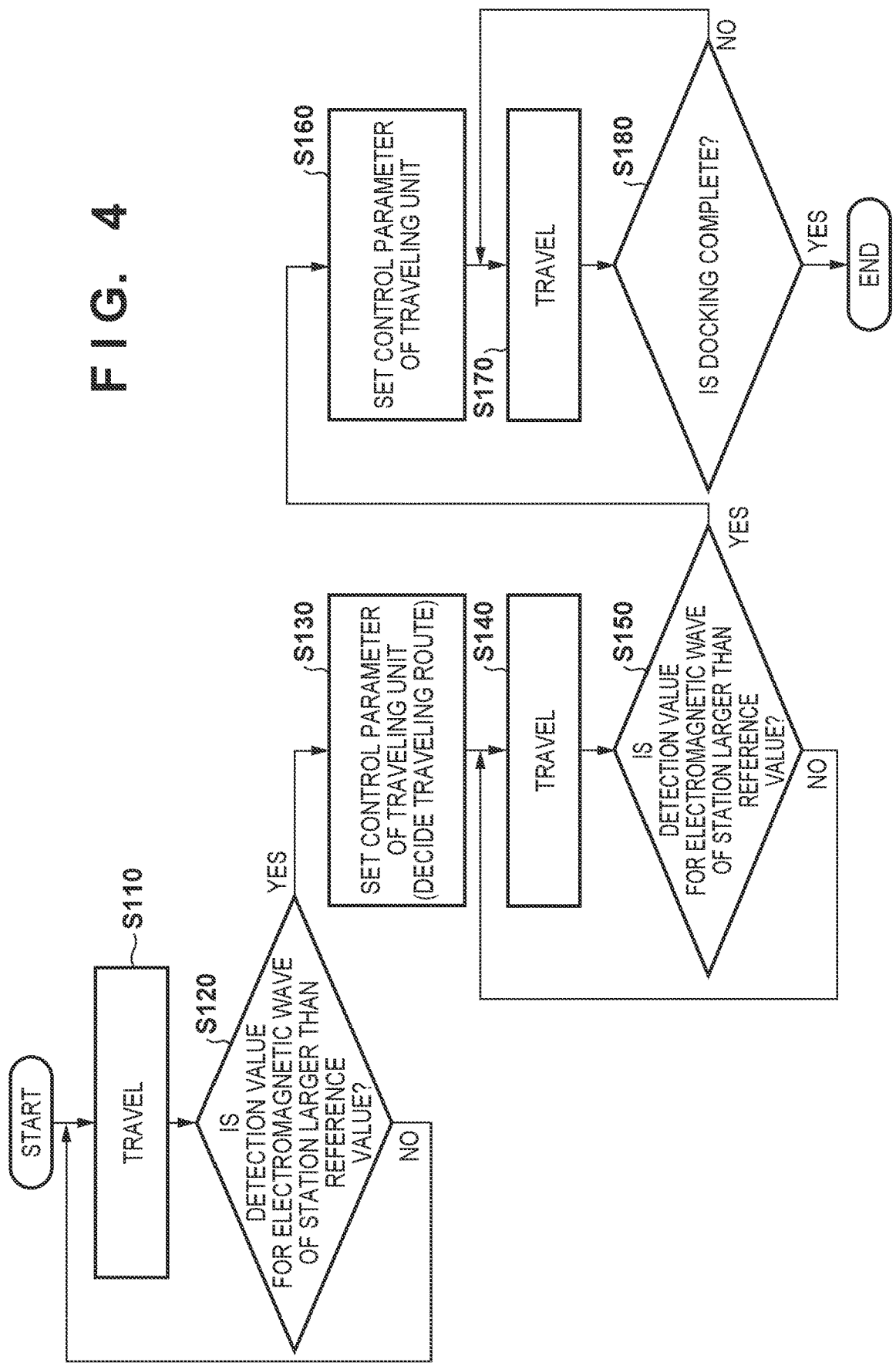

WORKING SYSTEM AND WORKING MACHINE

CROSS-REFERENCE TO RELATED APPLICATION

This application is a continuation of International Patent Application No. PCT/JP2017/007930 filed on Feb. 28, 2017, the entire disclosures of which is incorporated herein by reference.

TECHNICAL FIELD

The present invention relates to a working system and a working machine.

BACKGROUND ART

PTL 1 describes the structure of an unmanned traveling working machine (for example, a lawn mower). According to PTL 1, the working machine automatically performs a work (for example, lawn mowing) within a working area. More specifically, the working area is partitioned by a wire (an area wire). The working machine travels within the working area by detecting an electromagnetic wave from an area wire. If the working machine falls outside the working area, the working machine travels to return to the working area.

CITATION LIST

Patent Literature

PTL 1: Japanese Patent No. 5828776

SUMMARY OF INVENTION

Technical Problem

According to PTL 1, a battery is incorporated into the working machine. When the remaining amount of the battery becomes lower than a reference value, the working machine returns to a station (a charger) based on the electromagnetic wave of the area wire. When the working machine is connected to the station, charging of the battery is started. In this case, after the working machine returns near the station, the appropriate contact with the station may not be achieved if the entrance posture of the working machine to the station is not appropriate.

It is an object of the present invention to control the entrance posture of the working machine to the station.

Solution to Problem

According to the first aspect of the present invention, there is provided a working system comprising a self-propelled working machine, an area wire configured to partition a working area of the working machine, and a station provided in the working area and configured to charge the working machine by connecting the working machine to the station, wherein the working machine comprises a traveling unit, a traveling control unit configured to control the traveling unit, a detection unit configured to detect the station, and an information acquisition unit, the information acquisition unit acquires input information which is input by a user, and the input information includes information indicating a layout of the station and the area wire for the station and its peripheral region, and the traveling control unit sets a control parameter of the traveling unit based on the input information in response to detection of the station by the detection unit.

Advantageous Effects of Invention

According to the present invention, the entrance posture of the working machine to the station can be controlled.

BRIEF DESCRIPTION OF DRAWINGS

FIGS. 2A and 2B are views for explaining the arrangement example of the working machine;

FIG. 4 is a flowchart for explaining the traveling control sequence of the working machine;

DESCRIPTION OF EMBODIMENTS

Figure 1:
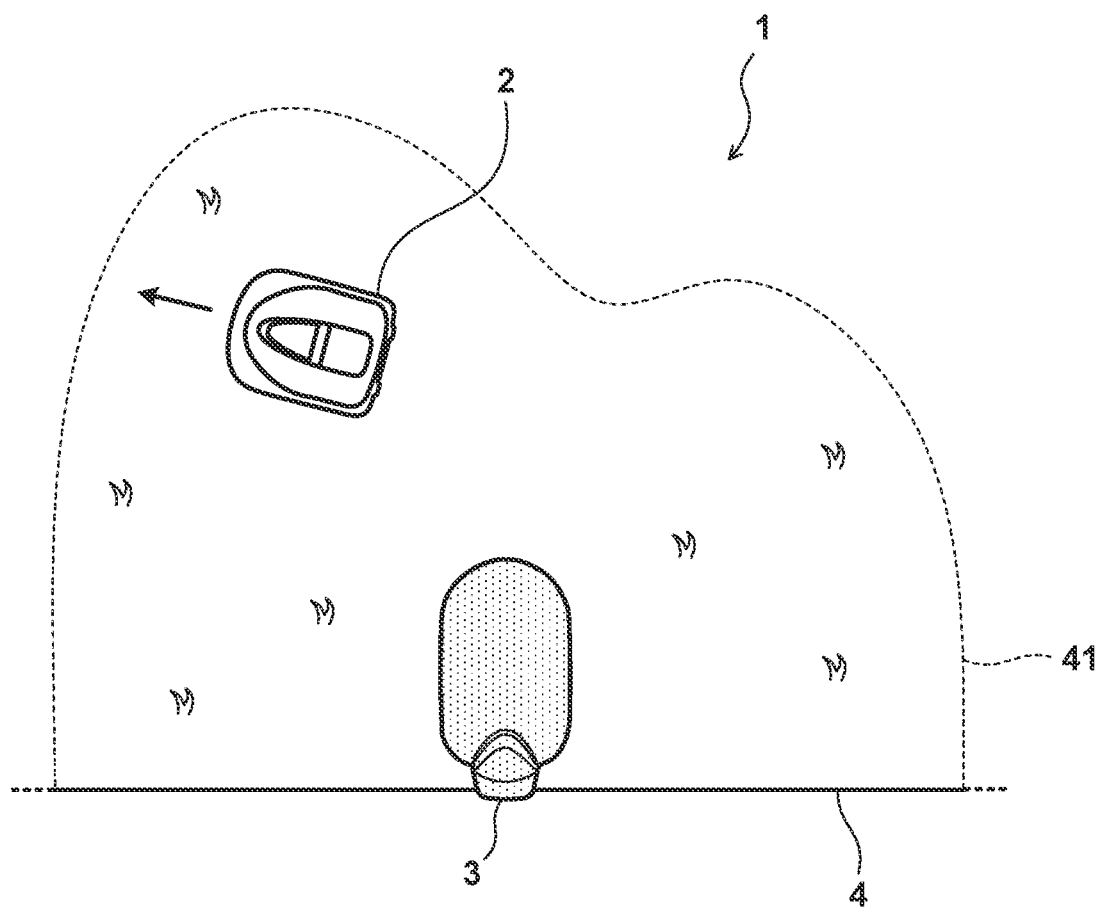
FIG. 1 is a view for explaining the arrangement example of an automatic working system comprising a working machine and a station.

An embodiment of the present invention will now be described with reference to the accompanying drawings. Note that the drawings are schematic views showing structures or arrangements according to the embodiment, and the dimensions of members shown in the drawings do not necessarily reflect the actuality. In addition, the same reference numerals denote the same members or same constituent elements in the drawings, and a repetitive description in this specification will be omitted.

(Arrangements of Working System, Working Machine, and Station)

FIG. 1 is a schematic view showing the arrangement of a working system 1 according to an embodiment. The working system 1 includes a working machine 2, a station 3, and an area wire 4. The working machine 2 is a self-propelled unmanned working robot and performs a work while running based on a predetermined operation sequence. The working machine 2 is a lawn mower for performing lawn mowing according to this embodiment. The working machine 2 may be a cleaning robot for performing cleaning as another embodiment. Note that an arrow in FIG. 1 indicates the traveling direction of the working machine 2.

The station 3 is a charger for charging the working machine 2 by connecting the working machine 2 to the station 3. Although described in detail later, the station 3 generates an electromagnetic wave (for example, a magnetic field), and the working machine 2 can enter the station 3 by detecting the station 3 based on this electromagnetic wave. The area wire 4 is a wire for partitioning a working area 41 of the working machine 2. In FIG. 1, part of the area wire 4 is illustrated, but the wire is arranged integrally in a ring shape. The area wire 4 is connected to the station 3 and generates an electromagnetic wave upon reception of the power from the station 3. The working machine 2 detects the electromagnetic wave of the area wire 4 to perform a work (lawn mowing in this embodiment) within the working area 41. If the working machine 2 falls outside the working area 41, the working machine 2 travels so as to return to the working area 41. The area wire 4 is generally installed under the ground in a yard, but may be exposed from the ground surface.

FIG. 2A is a block diagram showing the system arrangement of the working machine 2. The working machine 2 includes a traveling unit 21, a working unit 22, a detection unit 23, control unit 24, and an external communication interface 25. The traveling unit 21 includes a left rear wheel 211L and a right rear wheel 211R, and motors 212L and 212R for driving the left and right rear wheels. The working unit 22 includes a blade 221 for performing lawn mowing and a motor 222 for driving the blade 221. The blade 221 is arranged at the bottom portion of the machine body of the working machine 2. The working machine 2 travels and performs lawn mowing by driving the blade 221 by the motor 222.

The detection unit 23 includes electromagnetic wave detection units 231, an obstacle sensor 232, and a main body information sensor 233. The electromagnetic wave detection units 231 detect the electromagnetic waves of the station 3 and the area wire 4. In this case, the type (for example, the frequency) of the electromagnetic wave of the station 3 is different from that of the area wire 4. The electromagnetic wave detection units 231 can detect these electromagnetic waves while discriminating them from each other. The obstacle sensor 233 is a sensor for bypassing an obstacle (for example, a stone) within the working area 41. A main body information sensor 234 is a sensor for detecting the states of the working machine 2 itself such as the posture, vehicle speed, angular velocity, and the like of the working machine 2. The main body information sensor 234 includes, for example, a G sensor, a vehicle speed sensor, an angular velocity sensor, and the like. Note that various exemplified sensors are merely examples. The detection unit 23 can further include other sensors.

The control unit 24 is an ECU (Electronic Control Unit) and includes a CPU (Central Processing Unit) 241 and a memory 242. The functions of the control unit 24 are implemented by semiconductor integrated circuits such as a PLD (Programmable Logic Device) and an ASIC (Application Specific Integrated Circuit). However, the functions of the control unit 24 may be implemented by software as another embodiment. That is, the functions of the control unit 24 can be implemented by either hardware or software.

According to this embodiment, the CPU 241 can function as a traveling control unit 2411, a working control unit 2412, and an information acquisition unit 2413. For example, the CPU 241 functions as the traveling control unit 2411 to control the traveling unit 21. The CPU 241 functions as the working control unit 2412 to control the working unit 22. The CPU 241 functions as the information acquisition unit 2413 to acquire necessary information from the memory 242. For the descriptive convenience, the following description will be made using the control unit 24 as the control entity.

The external communication interface 25 is an interface for receiving input information from the user. The control unit 24 memorizes (stores) the input information received by the external communication interface 25 in the memory 242. According to this embodiment, the input information can be input using a portable terminal (for example, a portable type input terminal such as a smartphone) by the user. Accordingly, the user can input the input information without directly accessing the working machine 2 (from a location remote from the working machine or from a remote place). As another embodiment, the working machine 2 may further include an input terminal for receiving this input information. In this case, the user can directly input the input information to this input terminal.

Figure 2B:
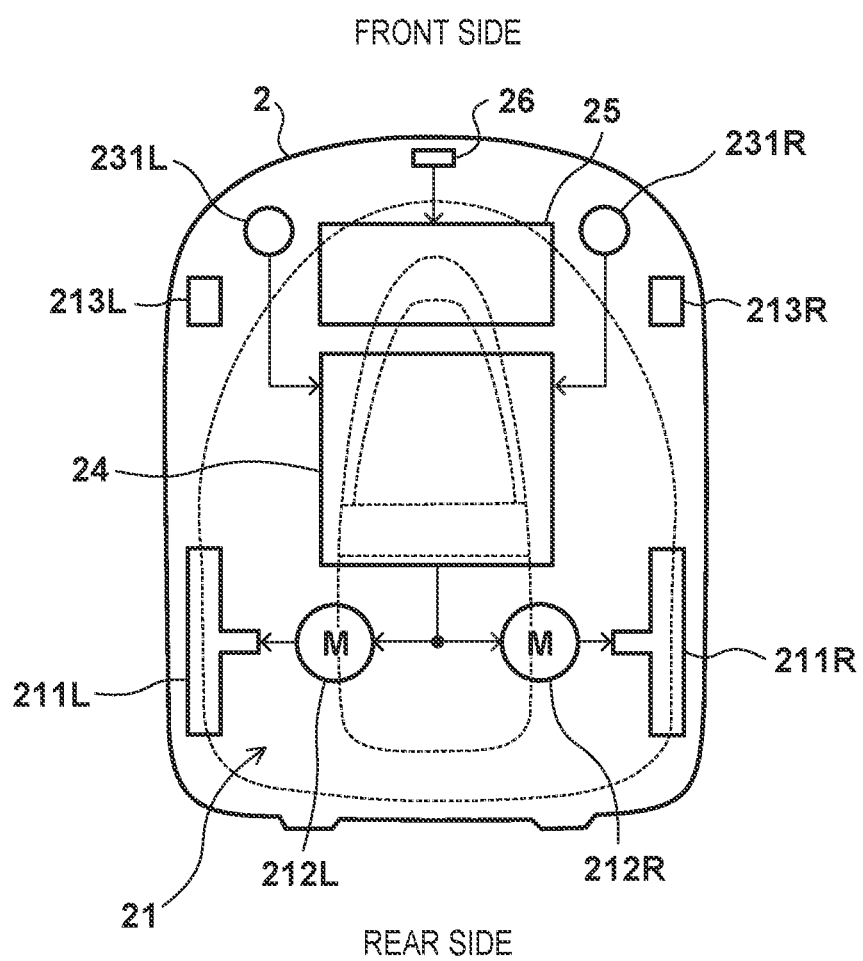

FIG. 2B is a schematic view showing the structure of the working machine 2. A left front wheel 213L and a right front wheel 213R as part of the traveling unit 21 are arranged at the front left side and the front right side of the working machine 2. The front left wheel 213L and the front right wheel 213R are driven wheels (rotatable). That is, the body of the working machine 2 is supported by the four wheels, that is, the rear wheels 211L and 211R and the front wheels 213L and 213R. The rear wheels 211L and 211R are independently driven by motors 212L and 212R, respectively.

For example, when both the rear wheels 211L and 211R are set at a rotation speed corresponding to +0.1 m/s (in this case, + indicates the rotation in the forward direction), the working machine 2 travels straight at a speed of 0.1 m/s. In addition, when both the rear wheels 211L and 211R are set at a rotation speed corresponding to −0.05 m/s (in this case, − indicates the rotation in the backward direction), the working machine 2 travels backward at a speed of 0.05 m/s. For example, when the rear left wheel 211L is set at a rotation speed corresponding to +0.1 m/s and the rear right wheel 211R is set at a rotation speed corresponding to +0.05 m/s, the working machine 2 turns right. For example, when the rear left wheel 211L is set at a rotation speed corresponding to +0.05 m/s and the rear right wheel 211R is set at a rotation speed corresponding to −0.05 m/s, the working machine 2 rotates clockwise at the same position.

The working machine 2 further includes a battery 25 and a connector 26 for charging the battery 25. The connector 26 is arranged in the front side of the working machine 2. When charging the working machine 2, the working machine 2 enters the station 3 from the front side. Note that when starting the work, the working machine 2 moves backward from the station 3, turns to change the traveling direction, and moves forward, thereby starting the working machine 2 from the station 3.

As shown in FIG. 2B, according to this embodiment, the electromagnetic wave detection units 231 are arranged on the front left side and the front right side, respectively, of the working machine 2. That is, the working machine 2 includes a total of two electromagnetic wave detection units 231. The electromagnetic wave detection unit 231 on the front left side is referred to as an "electromagnetic wave detection unit 231L", and the electromagnetic wave detection unit 231 on the front right side is referred to as an "electromagnetic wave detection unit 231R" in order to discriminate them from each other. If these detection units need not be discriminated from each other, the detection units will be expressed as the "electromagnetic wave detection units 231". The control unit 24 can detect the position of the working machine 2 with respect to the area wire 4 based on the detection values of the electromagnetic wave detection units 231L and 231R.

For example, when the detection values of the electromagnetic waves of the area wire 4 by the electromagnetic wave detection units 231L and 231R are positive, the control unit 24 determines that the working machine 2 is traveling within the working area 41. For example, when one of the detection values of the electromagnetic waves of the area wire 4 by the electromagnetic wave detection units 231L and 231R is positive and the other of the detection values is negative, the control unit 24 determines that the working machine 2 is traveling on the area wire 4 (the working machine 2 is positioned on the partition boundary of the working area 41). In addition, for example, when the detection values of the electromagnetic waves of the area wire 4 by the electromagnetic wave detection units 231L and 231R are negative, the control unit 24 determines that the working machine 2 is traveling outside the working area 41 and changes to cause the working machine 2 to return to the working area 41.

For example, when the detection values of the electromagnetic waves of the area wire 4 by the electromagnetic wave detection units 231L and 231R are positive and are different from each other, the control unit 24 can also determine the side where the area wire 4 is positioned with respect to the traveling direction of the working machine 2 traveling within the working area 41. For example, if the detection value of the electromagnetic wave detection unit 231L is larger than the detection value of the electromagnetic wave detection unit 231R, the control unit 24 determines that the working machine 2 is traveling (in the clockwise direction (the CW direction) within the working area 41) in a state in which the working machine 2 is close to the area wire 4 on the left side of the traveling direction. On the other hand, if the detection value of the electromagnetic wave detection unit 231L is smaller than the detection value of the electromagnetic wave detection unit 231R, the control unit 24 determines that the working machine 2 is traveling (in the counterclockwise direction (the CCW direction) within the working area 41) in a state in which the working machine 2 is close to the area wire 4 on the right side of the traveling direction.

Figure 3:
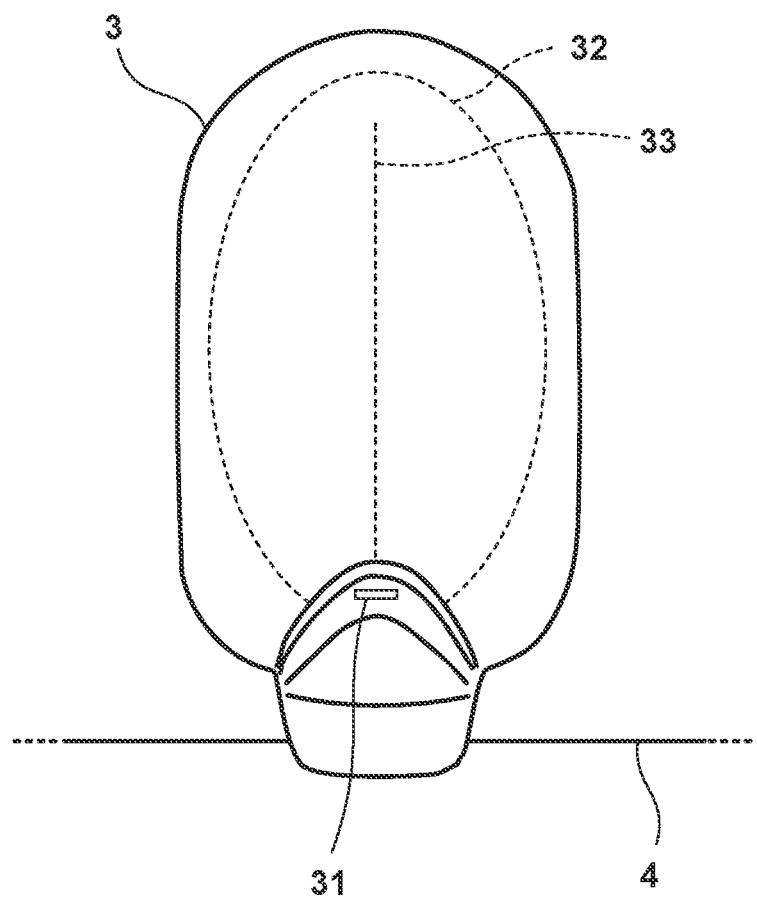
FIG. 3 is a view for explaining the arrangement example of the station.

FIG. 3 is a schematic view showing the structure of the station 3. The station 3 includes a charging connector 31, a station wire 32, and a docking wire 33. The connector 31 is arranged on the proximal portion side of the station 3 to which the area wire 4 is connected. When the working machine 2 enters into the station 3, the connector 26 of the working machine 2 is connected to the connector 31 of the station 3, thereby starting charging the battery 25. Note that the connector 26 and the connector 31 are arranged to be insertable, and one of the connectors can be a female/male connector.

The station wire 32 and the docking wire 33 are incorporated in the station 3 and generate electromagnetic waves of different types (for example, different frequencies). Note that the electromagnetic waves of the station wire 32 and the docking wire 33 are different from the electromagnetic wave of the area wire 4. As described above, the electromagnetic wave detection units 231 detect the electromagnetic waves while discriminating them from each other.

For example, if a distance from the working machine 2 to the station 3 is smaller than a predetermined value, the electromagnetic wave detection units 231 detect the electromagnetic wave of the station wire 32 (strictly, the detection value of the electromagnetic wave of the station wire 32 by the electromagnetic wave detection units 231 is larger than a reference value). Accordingly, the control unit 24 determines that the working machine 2 is traveling near the station 3. In other words, the station wire 32 notifies the working machine 2 traveling near the station 3 of information indicating that the working machine 2 is traveling near the station 3 by the electromagnetic wave. As described above, since the working machine 2 includes the two electromagnetic wave detection units 231L and 231R, the control unit 24 can detect the position of the working machine 2 with respect to the station 3.

For example, when the working machine 2 enters into the station 3, the electromagnetic wave detection units 231 detect the electromagnetic wave of the docking wire 33. Accordingly, the control unit 24 can determine whether the entrance angle of the working machine 2 with respect to the station 3 can be maintained so as to cause the connector 26 to come close to the connector 31. In other words, the docking wire 33 guides by the electromagnetic wave the working machine 2 which is entering the station 3 so as to properly connect the connector 26 and the connector 31. As described above, since the working machine 2 includes the two electromagnetic wave detection units 231L and 231R, the control unit 24 can determine the entrance angle of the working machine 2 with respect to the station 3.

In the following description, a state in which the connector 26 and the connector 31 are connected to each other to allow charging of the battery 25 is referred to as "docking" in some cases.

Note that in this embodiment, although each electromagnetic wave detection unit 231 detects the electromagnetic waves of the area wire 4, the station wire 32, and the docking wire 33 while discriminating them from each other, individual dedicated sensors may be arranged for electromagnetic waves, respectively, as another embodiment.

(Traveling Control Sequence)

FIG. 4 is a flowchart showing a traveling control sequence for properly implementing docking. This traveling control is started in response to the fact that the remaining amount of the battery 25 is smaller than the reference value, the fact that the working time of the working machine 2 ends, or the like. Note that the reference value of the remaining amount can be set as a value by which the working machine 2 can return to the station 3 from any position of the working area 41. In addition, the working time (for example, a start time, an execution time, and an end time) can be set in advance by causing the user to input the working time using a portable terminal.

As the outline of this traveling control, the control unit 24 first detects based on the electromagnetic wave of the station wire 32 that the working machine 2 is traveling near the station 3. After that, the control unit 24 decides the entrance route to the station 3 based on the installation mode of the station 3. The information indicating the installation mode of the station 3 is input as the input information by the user in advance before the start of the working of the working machine 2 (for example, when the working system 1 is installed) and is stored in the memory 242. For this reason, the entrance posture of the working machine 2 to the station 3 can be appropriately controlled, thereby implementing proper docking. The installation mode of the station 3 includes the layout of the station 3 within the working area 41. For example, the installation mode includes, for example, the position and orientation (entrance enable direction of the working machine 2) of the station 3 within the working area 41, the shape of the working area 41 near the station 3, and the like.

In step S110 (to be simply referred to as "S110" hereinafter; this also applies to other steps), the working machine 2 is traveling within the working area 41 so as to return the working machine 2 to the station 3. S110 may be executed in a state in which working (lawn mowing) is stopped or in a state in which working is being performed.

In S120, the control unit 24 determines whether the detection value (to be referred to as $D_{ST}$) of the electromagnetic wave of the station wire 32 by each electromagnetic wave detection unit 231 is larger than a reference value (to be referred to as $D_{ST\_REF1}$). In general, the distance between the working machine 2 and the station 3 decreases, the intensity (the absolute value) of the electromagnetic wave of the station wire 32 increases. For this reason, if the detection value $D_{ST}$ is set larger than the reference value $D_{ST\_REF1}$, it is said that the working machine 2 is located near the station 3 (the working machine 2 enters the range of the predetermined distance from the station 3). If $D_{ST}>D_{ST\_REF1}$ is satisfied, the process advances to S130; otherwise, the process returns to S110 (the working machine 2 continues to search for the station 3).

In S130, the control unit 24 sets the control parameter of the traveling unit 21 based on the installation mode of the station 3 and the detection value of the electromagnetic wave of the area wire 4. This control parameter includes parameters for deciding the traveling route (the entrance route to the station 3) and the traveling speed of the working machine 2 accessorily. More specifically, this control parameter decides the magnitudes and rotation directions of the driving forces of the motors 212L and 212R for driving the rear wheels 211L and 211R. The details will be further described by exemplifying several cases later. By setting the control parameter of the traveling unit 21, the control unit 24 decides the proper traveling route to cause the working machine 2 to come close to the station 3. The traveling route or entrance route may be expressed as a locus.

The control unit 24 can determine the distance from the working machine 2 to the area wire 4 (whether the working machine 2 is near or far apart from the area wire 4) according to the detection value of the electromagnetic wave of the area wire 4. The control unit 24 causes the information acquisition unit 2413 to acquire the information indicating the installation mode of the station 3 prestored in the memory 242, and sets the control parameter (decides the traveling route) together with the determination result. This control parameter may be set based on the installation mode of the station 3 such as a look-up table or may be set by calculation of predetermined arithmetic processing.

Note that the control parameter may be changed over time, for example, upon the elapse of a predetermined time. Accordingly, for example, traveling routes coping with various installation modes of the station 3 such as the left turn after the right turn can be implemented. In addition, the traveling speed can be determined based on the traveling route. For example, if a turning radius is small, the traveling speed may be determined so as to reduce the traveling speed.

In S130, as another embodiment, in order to set the control parameter, the detection value ($D_{ST}$) of the electromagnetic wave of the station wire 32 may further be used together with the detection value of the electromagnetic wave of the area wire 4. As described above, since the working machine 2 includes the electromagnetic wave detection units 231L and 231R, the control unit 24 can determine the position of the working machine 2 with respect to the station 3 within the working area 41. An appropriate control parameter can be set even by this method.

In S140, traveling is performed as in S110. This traveling is performed by the control parameter set in S130, and accordingly, the working machine 2 can further move near the station 3.

In S150, the control unit 24 determines whether the detection value $D_{ST}$ of the electromagnetic wave of the station wire 32 by each electromagnetic wave detection unit 231 is set larger than a reference value ($D_{ST\_REF2}$ (>$D_{ST\_REF1}$). If the detection value $D_{ST}$ is set larger than the reference value $D_{ST\_REF2}$, it can be said that the working machine 2 is further moved near the station 3 or the preparation for the start of entrance of the working machine 2 to the station 3 is completed. If $D_{ST}>D_{ST\_REF2}$ is satisfied, the process advances to S160; otherwise, the process returns to S140 (the working machine 2 continuously travels to further come close to the station 3). Details will be described later by exemplifying several cases. In S150, since the working machine 2 further comes close to the station 3 using the control parameter set in S130, the working machine 2 can move to a position where the working machine 2 can easily enter into the station 3.

In S160, the control unit 24 sets the control parameter of the traveling unit 21 based on the installation mode of the station 3. In S150, the working machine 2 further comes close to the station 3 and has moved to the position where the working machine 2 can easily enter into the station 3. The control unit 24 sets the control parameter of the traveling unit 21 so as to implement appropriate docking by causing the working machine 2 to start entering into the station 3 from that position. As in S130, the control parameter may be set by referring to a look-up table or by calculation of the predetermined arithmetic processing based on the installation mode of the station 3.

In S170, traveling is performed as in S110 and S140. This traveling is performed based on the control parameter set in S160. Accordingly, the working machine 2 enters into the station 3 and travels on the station 3 while being guided by the electromagnetic wave of the docking wire 33.

Note that in S170, the control unit 24 may lose the electromagnetic wave of the docking wire 33 due to, for example, mixing of another electromagnetic noise. In this case, the control unit 24 interrupts entrance of the working machine 2 or searches for the electromagnetic wave of the docking wire 33 for a predetermined time while rotating the working machine 2 at the position where the electromagnetic wave of the docking wire 33 is lost. The rotation of the working machine 2 can be executed such that the rear left wheel 211L is rotated at a speed corresponding to +0.05 m/s and the rear right wheel 211R is rotated at a speed corresponding to −0.05 m/s. If the electromagnetic wave of the docking wire 33 is detected again, the control unit 24 restarts the entrance of the working machine 2.

In S180, the control unit 24 determines whether docking is completed. If NO in S180, the process returns to S170; otherwise, this traveling control ends.

In summary, if the control unit 24 is traveling near the station 3 (that is, in response to establishment of $D_{ST}>D_{ST\_REF1}$), the working machine 2 is further moved close to the station 3 in the route decided based on the installation mode of the station 3. The working machine 2 is moved to a position where it can easily enter into the station 3. After the working machine 2 comes close to the station 3 (that is, in response to establishment of $D_{ST}>D_{ST\_REF1}$), the working machine 2 starts to enter into the station 3 in the route decided based on the installation mode of the station 3. After that, the working machine 2 travels on the station 3 while being guided by the electromagnetic wave of the docking wire 33, thereby implementing appropriate docking. The information indicating the installation mode of the station 3 can be prestored by the user, and the control unit 24 can control the entrance posture of the working machine 2 to the station 3 by referring to this information.

In this embodiment, the control parameter is set twice, that is, when $D_{ST}>D_{ST\_REF1}$ (S120) is satisfied and when $D_{ST}>D_{ST\_REF2}$ (S150) is satisfied. The number of times of the settings may be one or three or more. In addition, in this embodiment, the mode in which the control parameter is set based on the intensity (that is, the detection value $D_{ST}$) of the electromagnetic wave of the station wire 32 is exemplified. However, the present invention is not limited to this. For example, as another embodiment, the station wire 32 may output a plurality of electromagnetic waves having different types. In this case, the output distances of the plurality of electromagnetic waves are different from each other. The control unit 24 sets the control parameter in accordance with the detection of the distances by the electromagnetic wave detection units 231.

(Station Installation Mode)

Several examples of the installation modes of the station 3 and the entrance routes to the station 3 in these examples will be described with reference to FIGS. 5A to 5C and FIGS. 6A to 6C.

Case1 and Case2

Figure 5A:
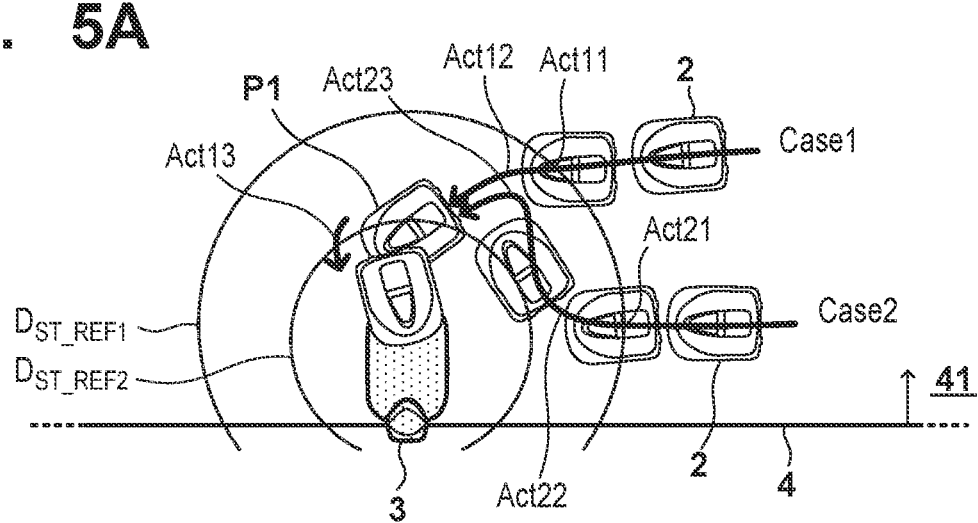
FIGS. 5A, 5B, and 5C are views for explaining several examples of the installation modes of the station.

FIG. 5A shows the standard installation layout (standard installation type) of the station 3. That is, the station 3 is installed in a direction perpendicular to the extending direction of the area wire 4. The working machine 2 enters into the station 3 in a direction almost perpendicular to the extending direction of the area wire 4.

First, as a case Case1 (to be simply referred to as Case1 hereinafter; this also applied to other cases), assume that the traveling working machine 2 enters into the station 3 in the CW direction within the working area 41 at a position relatively apart from the area wire 4. As described above, since the working machine 2 includes the two electromagnetic wave detection units 231L and 231R, the control unit 24 can determine that the working machine 2 is traveling in the CW direction.

In operation Act11 (to be simply referred to as Act11; this also applies to other operations), the working machine 2 causes each electromagnetic wave detection unit 321 to detect the electromagnetic wave of the station wire 32. Strictly, this indicates that $D_{ST} > D_{ST\_REF1}$ is satisfied (corresponding to S120 in FIG. 4). Accordingly, the control unit 24 determines that the working machine 2 is traveling near the station 3. In response to this, since the working machine 2 comes closer to the station 3, the control unit 24 sets the control parameter of the traveling unit 21 (corresponding to S130 in FIG. 4).

The control parameter is set based on the installation mode of the station 3 prestored in the memory 242 and the detection value (that is, the distance from the working machine 2 to the area wire 4) of the electromagnetic value of the area wire 4. By using this control parameter, the traveling route for making the working machine 2 come closer to the station 3 is decided. For example, the turning radius and the traveling speed for making the working machine 2 come closer to the station 3, a timing for changing the turning angle during turning, and the like are decided. Although details will be described later, the control parameter is decided so as to relatively moderately turn the working machine 2 because the working machine 2 is traveling at a position relatively separated from the area wire 4 in Case1.

In Act12, the working machine 2 travels in accordance with the control parameter set in Act11 and comes closer to the station 3 (corresponding to S140 in FIG. 4). Since the working machine 2 is traveling at the position relatively separated from the area wire 4 in Case1, the working machine 2 can be moved to a position P1 near the front side of the station 3 by causing the working machine 2 to relatively moderately turn. The position P1 is the position near the front side of the station 3, but can be any position where each electromagnetic wave detection unit 231 can appropriately detects the electromagnetic wave of the docking wire 33 by causing the working machine 2 to turn left in Act13.

In Act13, in response to the establishment of $D_{ST} > D_{ST\_REF2}$ (corresponding to S150 in FIG. 4), the control unit 24 sets the control parameter of the traveling unit 21 in order to cause the working machine 2 to enter into the station 3 in an appropriate posture (corresponding to S160 in FIG. 4). The control parameter is set based on the installation mode of the station 3 prestored in the memory 242. In Case1, the working machine 2 turns such that the working machine 2 comes close to the station 3 (the connector 26 of the working machine 2 faces the connector 31 of the station 3) (corresponding to S170 in FIG. 4). After that, the working machine 2 enters into the station 3 and travels on the station 3 while being guided by the electromagnetic wave of the docking wire 33, thereby completing docking (corresponding to S180 in FIG. 4).

Next, as Case2, assume that the working machine 2 enters into the station 3 in the CW direction within the working area 41 at a position relatively near the area wire 4. In Case1 described above, since the working machine 2 is traveling at the position relatively separated from the area wire 4, the working machine 2 can be moved to the position P1 near the front side of the station 3 by causing the working machine 2 to turn relatively moderately (see Act12). To the contrary, in Case2, since the working machine 2 is traveling at a position relatively near the area wire 4, a relatively abrupt turn is required to move the working machine 2 to the position P1 near the front side of the station 3.

In Act21, the control unit 24 sets the control parameter of the traveling unit 21 because the working machine 2 comes closer to the station 3 after the detection of the electromagnetic wave of the station wire 32 (corresponding to S120 to S130 in FIG. 4). In Case2, the working machine 2 must turn to the front side of the station 3. The control parameter for implementing this is set based on the installation mode of the station 3 prestored in the memory 242 and the detection value (that is, the distance from the working machine 2 to the area wire 4) of the electromagnetic wave of the area wire 4. More specifically, the traveling route of the working machine 2 is decided such that the working machine 2 makes a left turn in Act23 after the working machine 2 travels upon a right turn in Act22. Accordingly, the working machine 2 can move to the position P1 near the front side of the station 3 (corresponding to S140 in FIG. 4). After the working machine 2 moves up to the position P1, the working machine 2 enters into the station 3 in the same procedure as in Act13 of Case1, thereby completing docking (corresponding to S150 to S180 in FIG. 4).

In summary, after the detection (after the establishment of $D_{ST} > D_{ST\_REF1}$) of the electromagnetic wave of the station wire 32, the control unit 24 refers to the installation mode of the station 3 prestored in the memory 242, thereby setting the control parameter of the traveling unit 21 and deciding the entrance route of the working machine 2 into the station 3. Accordingly, the entrance posture of the working machine 2 when entering into the station 3 can be controlled. In this case, in any one of Case1 and Case2, the working machine 2 is moved to the position P1 near the front side of the station 3 after the detection of the electromagnetic wave of the station wire 32, then turns to face the front side of the station 3, and enters into the station 3. Therefore, appropriate docking can be implemented in each of Case1 and Case2.

Case3 and Case4

Figure 5B:
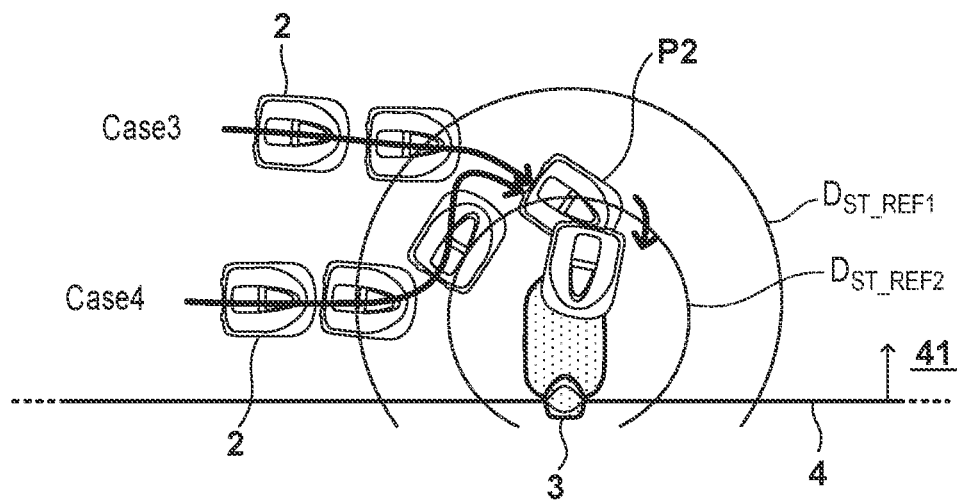

FIG. 5B shows a mode in which the working machine 2 traveling in the CCW direction enters the station 3 in the layout of the standard installation type (as in FIG. 5A). Case3 shows a case in which the working machine 2 traveling in the CCW direction within the working area 41 at a position relatively away from the area wire 4 enters the station 3. Case4 shows a case in which the working machine 2 traveling in the CCW direction within the working area 41 at a position relatively near the area wire 4 enters into the station 3.

As described above, since the working machine 2 includes the two electromagnetic wave detection units 231L and 231R, the control unit 24 can determine whether the working machine 2 is traveling in the CW or CCW direction. Case3 and Case4 can be assumed in the same manner as in Case1 and Case2 except that the working machine 2 is traveling in the direction opposite to that of Case1 and Case2. That is, in each of Case3 and Case4, upon detection of the electromagnetic wave of the station wire 32, the working machine 2 moves to a position P2 near the front side of the station 3, then turns to face the front side of the station 3, and enters into the station 3. In each of Case3 and Case4, appropriate docking can be implemented.

Case5 and Case6

Figure 5C:
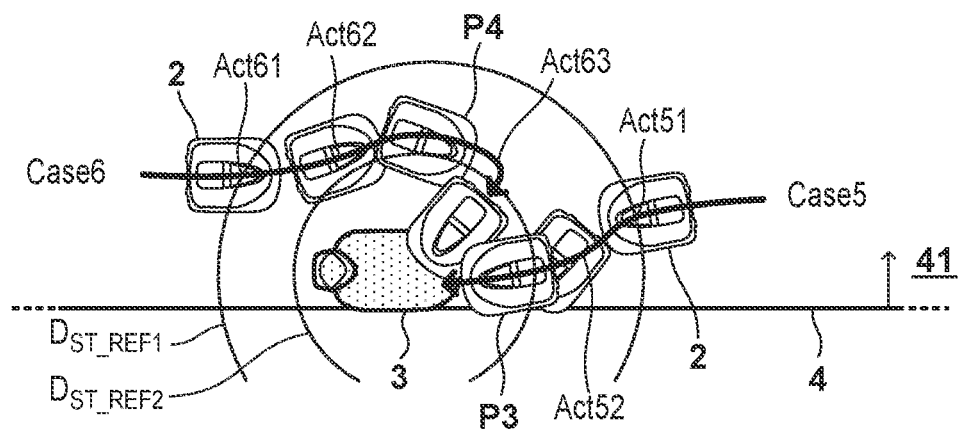

FIG. 5C shows the layout in which the station 3 is installed in a posture parallel to the extending direction of the area wire 4 (lateral installation type). In this case, the side which allows entrance of the working machine 2 is the right side. For this reason, when the working machine 2 is traveling in the CW direction, the side which allows entrance of the working machine 2 into the station 3 corresponds to the traveling direction of the working machine 2, and working machine 2 can relatively easily enter into the station 3. On the other hand, when the working machine 2 is traveling in the CCW direction, the side which allows entrance of the working machine 2 into the station 3 does not correspond to the traveling direction of the working machine 2. For this reason, a relatively abrupt turn is required.

As Case5, assume that the working machine 2 traveling in the CW direction within the working area 41 enters into the station 3. In this case, the control unit 24 can determine using the electromagnetic wave detection units 231L and 231R that the working machine 2 is traveling in the CW direction. Accordingly, in Act51, upon detection of the electromagnetic wave of the station wire 32, the control unit 24 sets the control parameter for implementing the following traveling route based on the above detection and the prestored installation mode (that is, the station 3 is set as the lateral installation type) of the station 3. As described above, in Case5 the side which allows entrance of the working machine 2 into the station 3 corresponds to the traveling direction of the working machine 2. Therefore, upon detection of the electromagnetic wave of the station wire 32, the control unit 24 can relatively easily move the working machine 2 to a position P3 near the front side of the station 3 in Act52.

Next, as Case6, assume that the working machine 2 traveling in the CCW direction within the working area 41 enters into the station 3. The control unit 24 can determine using the two electromagnetic wave detection units 231L and 231R that the working machine 2 is traveling in the CCW direction. In Act61, upon detection of the electromagnetic wave of the station wire 32, the control unit 24 sets the control parameter which implements the following traveling route based on the above detection and the prestored installation mode of the station 3. As described above, in Case6, the side which allows entrance of the working machine 2 into the station 3 does not correspond to the traveling direction of the working machine 2. For this reason, upon detection of the electromagnetic wave of the station wire 32, the control unit 24 makes the working machine 2 turn left so as to keep the distance to the station 3, and moves the working machine 2 to a position P4 lateral to the station 3 in Act62. This position P4 is an allowable position where each electromagnetic wave detection unit 231 can appropriately detect the electromagnetic wave of the docking wire 33 by making the working machine 2 turn right in Act63. Alternatively, the position P4 is a position on the right side of the allowable position in FIG. 5C.

In summary, after the detection (after the establishment of $D_{ST} > D_{ST\_REF1}$) of the electromagnetic wave of the station wire 32, the control unit 24 refers to the installation mode of the station 3 prestored in the memory 242, thereby setting the control parameter of the traveling unit 21 and deciding the entrance route of the working machine 2 into the station 3. Accordingly, the entrance posture of the working machine 2 when entering into the station 3 can be controlled. In Case5, upon detection of the electromagnetic wave of the station wire 32, the working machine 2 moves to the position P3 near the front side of the station 3 (corresponding to S120 to S140 in FIG. 4). After that, the working machine 2 turns to face the front side of the station 3 and enters into the station 3 (corresponding to S150 to S180 in FIG. 4). According to Case5, appropriate docking can be implemented.

On the other hand, in Case6, upon detection of the electromagnetic wave of the station wire 32, the working machine 2 moves to the position P4 lateral to the station 3 while maintaining the distance to the station 3 (corresponding to S120 to S140 in FIG. 4). After that, the working machine 2 turns right and enters into the station 3 (corresponding to S150 to S180 in FIG. 4). The position P4 can be an allowable position where each electromagnetic wave detection unit 231 can appropriately detect the electromagnetic wave of the docking wire 33 by making the working machine 2 turn right as described above. Alternatively, the position P4 can be a position on the right side of the allowable position. Therefore, even in Case6, the working machine 2 can appropriately enter into the station 3 and can perform appropriate docking.

Case7 and Case8

Figure 6A:
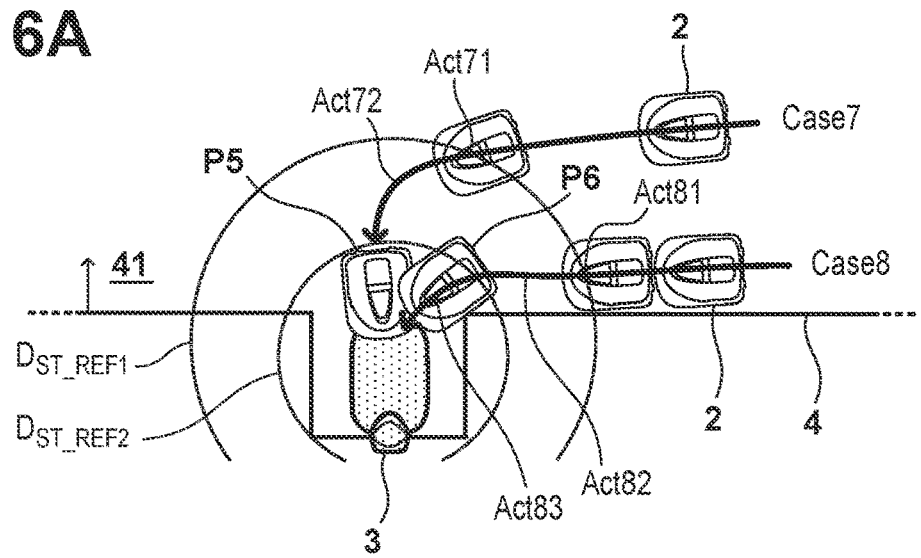
FIGS. 6A, 6B, and 6C are views for explaining several examples of the installation modes of the station.

FIG. 6A shows a layout (convex portion installation type) in which the working area 41 has a portion partitioned in a convex shape (alcove shape) and the station 3 is installed in this portion. In this example, the case in which the traveling direction of the working machine 2 is the CW direction is the same as the case in which the traveling direction of the working machine 2 is the CCW direction except that the traveling directions of the working machine 2 are opposite to each other. For this reason, only the case in which the traveling direction is the CW direction will be considered.

As Case7, assume that the working machine 2 traveling in the CW direction at a position relatively apart from the area wire 4 enters into the station 3. In Case7, an influence of the installation mode of the station 3 as the convex portion installation type is relatively small. That is, Case7 is the same as Case1 as the standard installation type described with reference to FIG. 5A. In Act71, upon detection of the electromagnetic wave of the station wire 32, the control unit 24 sets the control parameter for implementing the following traveling route based on the prestored installation mode of the station 3 and the detection value of the electromagnetic wave of the area wire 4. That is, in Act72, the working machine 2 relatively moderately turns left to move to a position P5 near the front side of the station 3. After that, the working machine 2 enters into the station 3 in the same procedure as in Act13 of Case1, thus completing docking.

Note that the detection value of the electromagnetic wave of area wire 4 in Act71 of Case7 is larger than that in Act11 of Case1. For this reason, to set the control parameter in Act71, a look-up table different from that in Act11 is referred to, and arithmetic processing different from that in Act11 is performed.

Next, as Case8, assume that the working machine 2 traveling in the CW direction at a position relatively near the area wire 4 enters the station 3. In Case8, since the installation mode of the station 3 is given as the convex portion installation type, the working machine 2 must turn left so as to enter the station 3 without falling outside the working area 41, that is, so as to bypass the corner of the area wire 4. For this reason, in Act81, upon detection of the electromagnetic wave of the station wire 32, the control unit 24 sets the control parameter for implementing the following traveling route based on the prestored installation mode of the station 3 and the detection value of the electromagnetic wave of the area wire 4. That is, in Act82, the working machine 2 travels straight along the extending direction of the area wire 4, passes by the corner of the area wire 4, and moves to a position P6. The position 6 is located on the right side of the position P5 near the front side of the station 3 in this example. However, the position 6 can be any position where each electromagnetic wave detection unit 231 can appropriately detects the electromagnetic wave of the docking wire 33 by causing the working machine 2 to turn left in Act83 to be performed next.

Even in the example of the convex portion installation type, after the detection (after the establishment of $D_{ST}>D_{ST\_REF1}$) of the electromagnetic wave of the station wire 32, the control unit 24 refers to the prestored installation mode of the station 3. This makes it possible to control the entrance posture of the working machine 2 when it enters into the station 3.

Case9

Figure 6B:
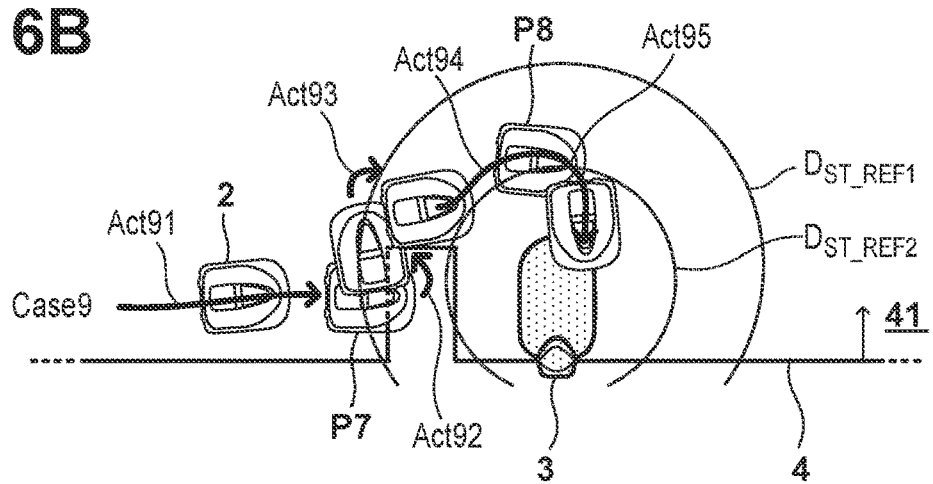

FIG. 6B shows a layout (concave portion adjacent installation type) in which the working area 41 has a portion partitioned in a concave shape, and the station 3 is installed near this portion. In this example, since the installation mode of the station 3 is given as the concave portion adjacent installation type, the working machine 2 must bypass so as to enter the station 3 without falling outside the working area 41, that is, avoid the concave shape of the working area 41.

As Case9, assume that the working machine 2 traveling in the CCW direction within the working area 41 in which the concave shape is formed on the left side of the station 3 enters into the station 3. In Act91, the working machine 2 is traveling in the CCW direction along the area wire 4. After that, the working machine 2 reaches a position P7, and each electromagnetic wave detection unit 231 detects the electromagnetic wave of the station wire 32. In response to this, the control unit 24 sets the control parameter for implementing the following traveling route based on the prestored installation mode (that is, the station 3 is of the concave portion adjacent installation type) of the station 3. That is, in Act92, the working machine 2 turns left to bypass the concave shape of the working area 41 and passes by the concave shape. In Act93, the working machine 2 turns right to bypass the concave shape. After that, in Act94, the working machine 2 turns right and moves to a position P8 near the front side of the station 3. Subsequently, in Act95, the working machine 2 turns to face the front side of the station 3 and enters into the station 3. Act94 and Act95 are performed in the same procedure as that of Act12 and Act13 in Case1 described above.

As described above, even in the example of the concave portion adjacent installation type, after the detection (after the establishment of $D_{ST}>D_{ST\_REF1}$) of the electromagnetic wave of the station wire 32, the control unit 24 refers to the prestored installation mode of the station 3. This makes it possible to control the entrance posture of the working machine 2 when entering into the station 3.

Case10

Figure 6C:
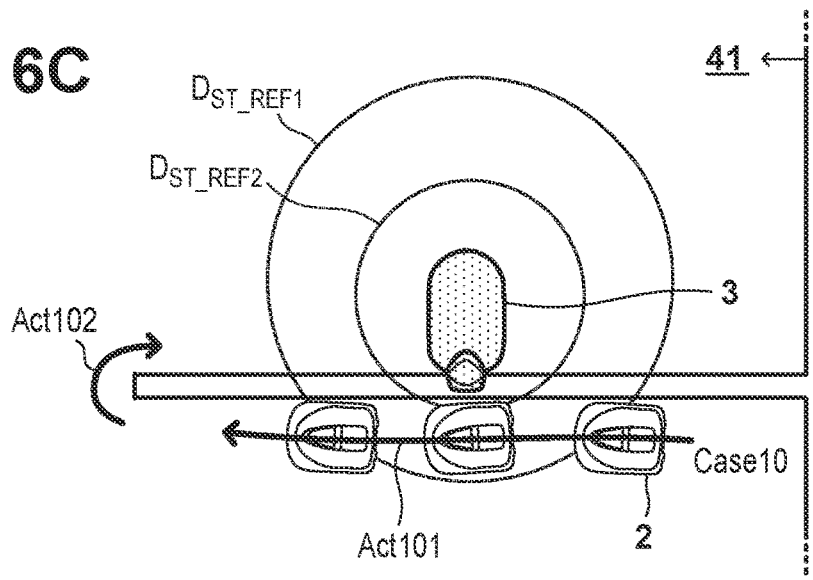

FIG. 6C shows a layout (folded portion installation type) in which the area wire 4 is arranged to be folded, two different portions in the area wire 4 extend parallel, and the station 3 is installed on one of the two different portions (folded portion installation type). In this example, since the installation mode of the station 3 is given by the folded portion installation type, the electromagnetic wave of the station wire 32 may be detected while the working machine 2 is traveling on the opposite side of the station 3 with respect to the folded area wire 4. In this case, the working machine 2 cannot return to the station 3 because the working machine 2 travels within the working area 41.

In Case10, as shown in Act101, while the working machine 2 is traveling on the opposite side of the station 3, the control unit 24 does not perform traveling control (see FIG. 4) for causing the working machine 2 to enter into the station 3 even if the electromagnetic wave of the station wire 32 is detected. Whether the working machine 2 is traveling on the opposite side of the station 3 can be determined by, for example, comparing the electromagnetic wave of the area wire 4 with the electromagnetic wave of the station wire 32 using the two electromagnetic wave detection units 231L and 231R. For example, the control unit 24 determines the position of the working machine 2 with respect to the station 3 within the folded portion installation type working area 41 based on the detection values of these electromagnetic waves, thereby determining whether the working machine 2 is traveling on the opposite side of the station 3. If the electromagnetic wave of the station wire 32 is detected while the working machine 2 is traveling on the opposite side of the station 3, the control unit 24 decides to skip the above traveling control.

Note that while the working machine 2 is traveling in the CCW direction, the working machine 2 bypasses the folding end of the area wire 4 and travels toward the station 3 in Act102. After that, the working machine 2 enters into the station 3 and completes docking in the same procedure as in Case2, Case4, and the like.

According to the example of the folded portion installation type, after the detection (after the establishment of $D_{ST}>D_{ST\_REF1}$) of the electromagnetic wave of the station wire 32, the control unit 24 refers to the prestored installation mode of the station 3. This makes it also possible to skip the traveling control for entering the working machine 2 into the station 3.

Others

The installation modes of the station 3 can be classified into several types to facilitate setting of the control parameter of the traveling unit 21 (that is, the decision of the entrance route into the station 3). According to this embodiment, the standard installation type (see FIGS. 5A and 5B), the lateral installation type (see FIG. 5C), the convex portion installation type (see FIG. 6A), the concave portion adjacent installation type (see FIG. 6B), and the folded portion installation type (see FIG. 6C) have been exemplified. These types are some of various installation modes of the station 3, and other types can further be added.

As the input information, the user can input information indicating the correspondence between the installation mode of the station 3 and one of the installation types and further input detailed sizes. For example, in the case of the convex portion installation type (see FIG. 6A), the user can further input the sizes of the convex shape of the working area 41.

For example, in the case of the concave portion adjacent installation type (see FIG. 6B), the user can input the sizes of the concave shape of the working area 41, the distance from the concave shape to the station 3, and the like. Accordingly, the control parameter of the traveling unit 21 can be appropriately set, and the appropriate entrance route into the station 3 can be decided.

In the above cases such as Case1, after the detection (after the establishment of $D_{ST}>D_{ST\_REF1}$) of the electromagnetic wave of the station wire 32 by the electromagnetic wave detection units 231, the control unit 24 may lose the electromagnetic wave of the station wire 32 due to mixing of another electromagnetic noise or the like. In this case, the control unit 24 may interrupt the traveling control for entering the working machine 2 into the station 3 and, for example, searches for the electromagnetic wave of the station wire 32 while rotating the working machine 2 for a predetermined time at the current position. The rotation of the working machine 2 can be executed such that, for example, the rear left wheel 211L is rotated at a speed corresponding to +0.05 m/s and the rear right wheel 211R is rotated at a speed corresponding to −0.05 m/s. If the electromagnetic wave of the station wire 32 is detected again, the control unit 24 restarts the above traveling control.

Summary of Embodiments

In the first mode, there is provided a working system (for example, 1) comprising a self-propelled working machine (for example, 2) and a station (for example, 3) configured to charge the working machine by connecting the working machine to the station, wherein the working machine comprises a traveling unit (for example, 21), a traveling control unit (for example, 24, 241, 2411) configured to control the traveling unit, a detection unit (for example, 23, 231) configured to detect the station, and an information acquisition unit (for example, 24, 241, 2413), the information acquisition unit acquires input information input by a user, the input information includes information indicating an installation mode of the station, and the traveling control unit sets a control parameter of the traveling unit based on the installation mode of the station in response to detection of the station by the detection unit.

According to the first mode, the working machine sets the control parameter, that is, decides the entrance route to the station based on the installation mode of the station input in advance. Therefore, the working machine can be connected to the station while the posture of entrance to the station can be appropriately controlled.

In the second mode, the installation mode of the station includes a layout of the station in a working area (for example, 41) of the working machine.

According to the second mode, the working machine decides the entrance route based on the layout of the station in the working area. Note that an example of the layout is the position of the station in the working area, its posture (that is, the direction in which the working machine can enter), the shape of the working area, and the like.

In the third mode, the working machine comprises a lawn mower (for example, 2).

According to the third mode, as an appropriate example, the working machine is applied to the lawn mower. Another application example is a cleaning robot for performing automatic cleaning within a predetermined area, or the like.

In the fourth mode, the station generates an electromagnetic wave (for example, a magnetic field), and the detection unit is configured to detect the electromagnetic wave from the station.

According to the fourth mode, the working machine can detect the station based on the electromagnetic wave from the station using the detection unit. With this arrangement, the working machine detects the station (detects that the working machine is traveling near the station), and the entrance route is decided in response to this detection.

In the fifth mode, the traveling control unit further sets a control parameter of the traveling unit based on a detection value (intensity) of the electromagnetic wave by the detection unit.

According to the fifth mode, the working machine can decide the entrance route based on the detection value of the electromagnetic wave. In general, the intensity of the electromagnetic wave is made small (weak) when the distance from the station increases. For this reason, the working machine can decided the entrance route based on the detection value of the electromagnetic wave, that is, the distance to the station.

In the sixth mode, the station generates a plurality of types (for example frequencies) of electromagnetic waves, and the traveling control unit sets a control parameter of the traveling unit in response to detection of one of the plurality of types of electromagnetic waves by the detection unit.

According to the sixth mode, the working machine can decide the entrance route based on the type of electromagnetic wave.

In the seventh mode, the working system further comprises an area wire (for example, 4) configured to partition the working area (for example, 41) of the working machine, the area wire generates an electromagnetic wave, the detection unit is further configured to detect the electromagnetic wave from the area wire, and the traveling control unit further sets the control parameter of the traveling unit based on an intensity of the electromagnetic wave from the area wire which is detected by the detection unit.

According to the seventh mode, the working machine can decide the entrance route to the station based on the intensity of the electromagnetic wave of the area wire, that is, the distance from the area wire.

In the eighth mode, the control parameter is a parameter for deciding a traveling route (locus) of the working machine to the station.

According to the eighth mode, the working machine decides the traveling route to the station using the control parameter. Note that the traveling speed of the working machine is also decided additionally. For example, when the working machine turns toward the station, a specific turning radius and a specific turning speed (more specifically, for example, if the turning radius is small, the traveling speed is low) are decided.

In the ninth mode, the traveling unit includes wheels (for example, 211L, 211R) and motors (for example, 212L, 212R) configured to drive the wheels, and the control parameter includes magnitudes of driving forces of the motors and rotation directions of the wheels.

According to the ninth mode, the traveling unit includes the wheels and the motors. For example, the turning radius and the traveling speed are decided in accordance with the driving forces (rotation speeds of the wheels) of the motors and the rotation directions of the wheels. For example, if the left wheel (for example, 211L) is rotated corresponding to +0.1 m/s and the right wheel (for example, 211R) is rotated at a rotation speed corresponding to +0.05 m/s, the working machine turns right.

In the 10th mode, the input information is input using a portable terminal of the user.

According to the 10th mode, the portable terminal is a portable type terminal such as a smartphone. Using this terminal, the user can input the input information without directly accessing the working machine (that is, from the location remote from the working machine). Note that the user can set the working time such as a working start time and a working end time other than information indicating the installation mode of the station.

In the 11th mode, there is provided a chargeable self-propelled working machine (for example, 2) by being connected to a station (for example, 3), comprising a storage unit (for example, 242) for storing information indicating an installation mode of the station, a traveling unit (for example, 21) for traveling the working machine, and a control unit (for example, 2411) for controlling the traveling unit, wherein the installation mode of the station is set in the storage unit by a user in advance, and the control unit controls an entrance posture of the working machine into the station based on the installation mode of the station.

According to the 11th mode, the installation mode of the station is set in the storage unit of the working machine in advance, and the working machine appropriately controls the entrance posture of the working machine into the station based on this installation mode. Therefore, appropriate connection of the working machine to the station can be implemented.

In the 12th mode, the working machine further comprises a communication unit (for example, 25) for receiving the information indicating the installation mode of the station from a portable terminal of the user.

According to the 12th mode, the user can input information indicating the installation mode of the station without directly accessing the working machine.

The present invention is not limited to the above-described embodiments, and various changes and modifications can be made within the spirit and scope of the present invention. Therefore, to apprise the public of the scope of the present invention, the following claims are made.

The invention claimed is:

1. A working system comprising a self-propelled working machine, an area wire configured to partition a working area of the working machine, and a station provided in the working area and configured to charge the working machine by connecting the working machine to the station, the station including a station wire,
wherein the working machine comprises a traveling unit, a detector configured to detect the station based on the station wire, and a memory,
at least one processor circuit with the memory comprising instructions, that when executed by the processor circuit, causes the at least one processor circuit to at least:
acquire input information, which is stored in the memory, indicating an installation mode of the station, which includes a position and an orientation of the station within the working area and/or a shape of the working area near the station, and
control the traveling unit, including setting a control parameter of the traveling unit based on the input information when the detector detects, based on the station wire, that the working machine comes within a predetermined distance from the station, the control parameter being for deciding a traveling route to cause the working machine to access the station.

2. The working system according to claim 1, wherein the working machine comprises a lawn mower.

3. The working system according to claim 1, wherein the station generates an electromagnetic wave, and the detector is configured to detect the electromagnetic wave from the station.

4. The working system according to claim 3, wherein the control of the traveling unit includes setting the control parameter of the traveling unit based on a detection value of the electromagnetic wave by the detector.

5. The working system according to claim 3, wherein the station generates a plurality of types of electromagnetic waves, and the control of the traveling unit includes setting the control parameter of the traveling unit in response to detection of one of the plurality of types of electromagnetic waves by the detector.

6. The working system according to claim 1, wherein the area wire generates an electromagnetic wave, the detector is further configured to detect the electromagnetic wave from the area wire, and the control of the traveling unit includes setting the control parameter of the traveling unit based on an intensity of the electromagnetic wave from the area wire which is detected by the detector.

7. The working system according to claim 1, wherein the control parameter is a parameter for deciding a traveling route of the working machine to the station.

8. The working system according to claim 7, wherein the traveling unit includes wheels and motors configured to drive the wheels, and the control parameter includes magnitudes of driving forces of the motors and rotation directions of the wheels.

9. The working system according to claim 1, wherein the input information is input using a portable terminal of the user.

10. A chargeable self-propelled working machine charged by being connected to a station, configured to work in a working area, the station including a station wire, the working machine comprising:
a memory configured to store information indicating an installation mode which includes a position and an orientation of the station within the working area and/or a shape of the working area near the station;
a detector configured to detect the station based on the station wire;
a traveling unit configured to travel the working machine; and
at least one processor circuit including the memory comprising instructions, that when executed by the processor circuit, causes the at least one processor circuit to at least:
when the detector detects, based on the station wire, that the working machine comes within a predetermined distance from the station, decide a proper traveling route to cause the working machine to access the station, based on the information which is set in the memory.

11. The working machine according to claim 10, further comprising a communication interface to input the information indicating the installation mode of the station from a portable terminal of the user.

* * * * *